(12) United States Patent
 Zheng et al.

(10) Patent No.: US 10,977,331 B2
(45) Date of Patent: Apr. 13, 2021

(54) CLOSING A PLURALITY OF WEBPAGES IN A BROWSER

(71) Applicant: INTERNATIONAL BUSINESS MACHINES CORPORATION, Armonk, NY (US)

(72) Inventors: Yun Zheng, Beijing (CN); Yu Zhou, Beijing (CN); Qian Xia Song, Beijing (CN); Yan Ting Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/520,416

(22) Filed: Jul. 24, 2019

(65) Prior Publication Data

US 2021/0026912 A1    Jan. 28, 2021

(51) Int. Cl.
    *G06F 17/00*       (2019.01)
    *G06F 16/955*      (2019.01)
    *G06F 16/901*      (2019.01)
    *G06F 40/154*      (2020.01)

(52) U.S. Cl.
    CPC ........ *G06F 16/9558* (2019.01); *G06F 16/902* (2019.01); *G06F 40/154* (2020.01)

(58) Field of Classification Search
    CPC .... G06F 3/0483; G06F 3/0482; G06F 16/902; G06F 40/154
    USPC ................................................. 715/206, 788
    See application file for complete search history.

(56) References Cited

U.S. PATENT DOCUMENTS

| | | | | |
|---|---|---|---|---|
| 6,028,602 A | * | 2/2000 | Weidenfeller | G06F 3/0481 715/781 |
| 7,565,621 B2 | * | 7/2009 | Molander | G06F 9/451 715/805 |
| 8,078,951 B2 | * | 12/2011 | Hintermeister | G06F 16/93 715/206 |
| 8,762,879 B1 | * | 6/2014 | Goodger | G06F 16/957 715/777 |

(Continued)

FOREIGN PATENT DOCUMENTS

| | | |
|---|---|---|
| CN | 101539912 A | 9/2009 |
| CN | 103049313 A | 4/2013 |

(Continued)

OTHER PUBLICATIONS

Graphical Tree-based persistent multi-level structure tab grouping visualization browser functionality, IP.com, Published Mar. 4, 2019 (Year: 2019).*

(Continued)

*Primary Examiner* — Stephen S Hong
*Assistant Examiner* — Matthew J Ludwig
(74) *Attorney, Agent, or Firm* — Teddi E. Maranzano

(57) ABSTRACT

Embodiments of the present disclosure relate to a method for closing a plurality of webpages in a browser. According to the method, one or more records are acquired in response to receiving an instruction to close a first webpage. Each record comprises at least two URLs having a parent-child relationship. A URL chain of the first webpage is acquired based on the acquired one or more records in response to receiving an instruction to close a plurality of webpages related to the URL chain. The URL chain consists of a plurality of URLs having a multi-level parent-child relationship. The plurality of webpages related to the URL chain are closed.

20 Claims, 11 Drawing Sheets

(56) References Cited

U.S. PATENT DOCUMENTS

| | | | |
|---|---|---|---|
| 9,614,900 B1* | 4/2017 | Jain | G06F 16/957 |
| 10,459,992 B2* | 10/2019 | Ghanekar | G06F 16/9535 |
| 2004/0133671 A1* | 7/2004 | Taniguchi | H04L 29/06 |
| | | | 709/224 |
| 2005/0080768 A1* | 4/2005 | Zhang | G06F 16/832 |
| 2005/0120292 A1* | 6/2005 | Suzuki | G06F 16/958 |
| | | | 715/206 |
| 2005/0171932 A1* | 8/2005 | Nandhra | G06F 16/951 |
| 2005/0235220 A1* | 10/2005 | Duperrouzel | G06F 16/957 |
| | | | 715/788 |
| 2007/0079236 A1* | 4/2007 | Schrier | G06F 40/186 |
| | | | 715/206 |
| 2011/0252363 A1* | 10/2011 | Tsuda | G06F 3/0483 |
| | | | 715/788 |
| 2013/0339896 A1* | 12/2013 | Shadle | G06F 30/20 |
| | | | 715/777 |
| 2016/0139750 A1* | 5/2016 | Barrus | G06F 3/0483 |
| | | | 715/777 |
| 2016/0162304 A1* | 6/2016 | Seacat DeLuca | G06F 9/4451 |
| | | | 718/102 |
| 2016/0188138 A1* | 6/2016 | Chen | G06F 16/957 |
| | | | 715/777 |

FOREIGN PATENT DOCUMENTS

| | | |
|---|---|---|
| CN | 103729178 A | 4/2014 |
| IN | 201611035958 A | 4/2018 |

OTHER PUBLICATIONS

Disclosed Anonymously, "Efficient Browser With Smart Tabs", An IP.com Prior Art Database Technical Disclosure, IP.com No. IPCOM000250568D, IP.com Electronic Publication Date: Aug. 3, 2017, 3 pages.

Mell et al., "The NIST Definition of Cloud Computing", Recommendations of the National Institute of Standards and Technology, Special Publication 800-145, Sep. 2011, 7 pages.

\* cited by examiner

500

S502
REQUIRE A URL OF THE NEW WEBPAGE FROM A REQUEST IN RESPONSE TO ACQUIRING THE REQUEST TO ACCESS A NEW WEBPAGE

S504
DETERMINE THAT THE NEW WEBPAGE AND A CURRENT ACTIVE WEBPAGE HAVE A PARENT-CHILD RELATIONSHIP IN RESPONSE TO RETRIEVING THE URL OF THE NEW WEBPAGE FROM A URL LIST OF THE CURRENT ACTIVE WEBPAGE

S506
RECORD THE PARENT-CHILD RELATIONSHIP BETWEEN THE NEW WEBPAGE AND THE CURRENT ACTIVE WEBPAGE AS A RECORD

FIG. 5

CLOSING A PLURALITY OF WEBPAGES IN A BROWSER

BACKGROUND

The present invention relates to web applications, and more specifically, to methods, systems and computer program products for webpage management in a browser.

Nowadays, many people browse information resources on World Wide Web (WWW) using a web browser. Each individual webpage can be identified by a distinct Uniform Resource Locator (URL), enabling these resources to be acquired from a web server and be displayed on a client device.

SUMMARY

Embodiments of the present invention disclose methods, systems and computer program products. According to one embodiment of the present invention, one or more records are acquired in response to receiving an instruction to close a first webpage. Each record comprises at least two URLs having a parent-child relationship. A URL chain of the first webpage is acquired based on the acquired one or more records in response to receiving an instruction to close a plurality of webpages related to the URL chain. The URL chain consists of a plurality of URLs having a multi-level parent-child relationship. The plurality of webpages related to the URL chain are closed.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 depicts an example method for recording parent-child relationship between two webpages according to an embodiment of the present disclosure.

DETAILED DESCRIPTION

Figure 1:
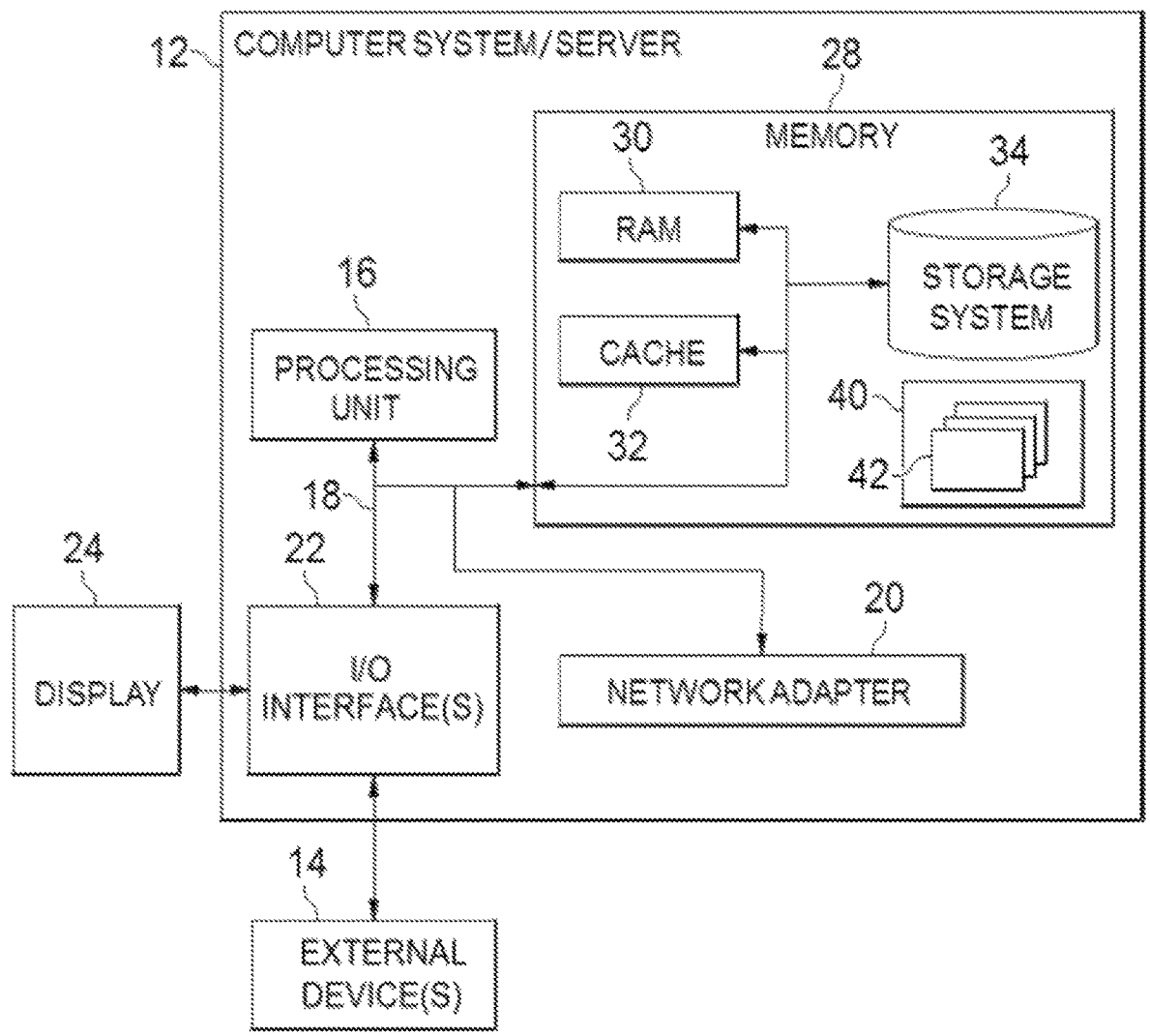
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
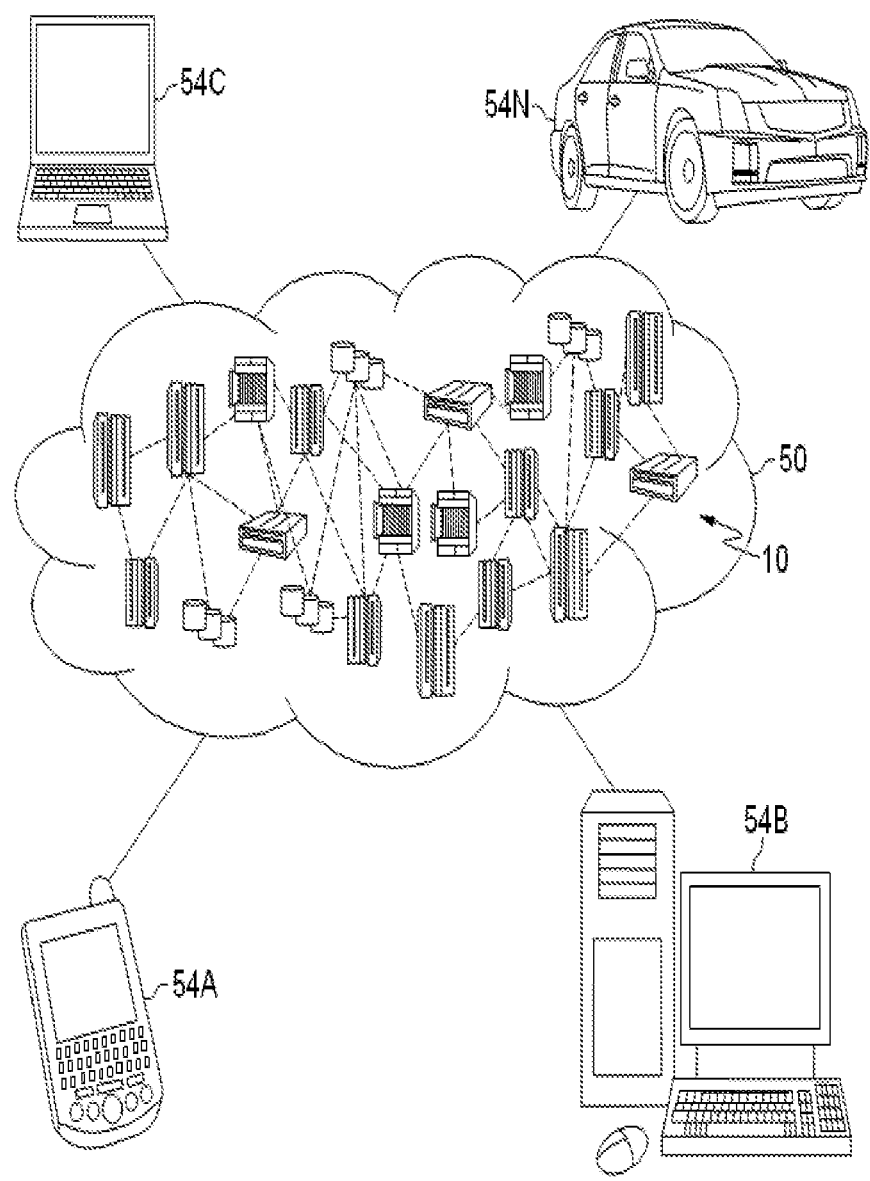
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
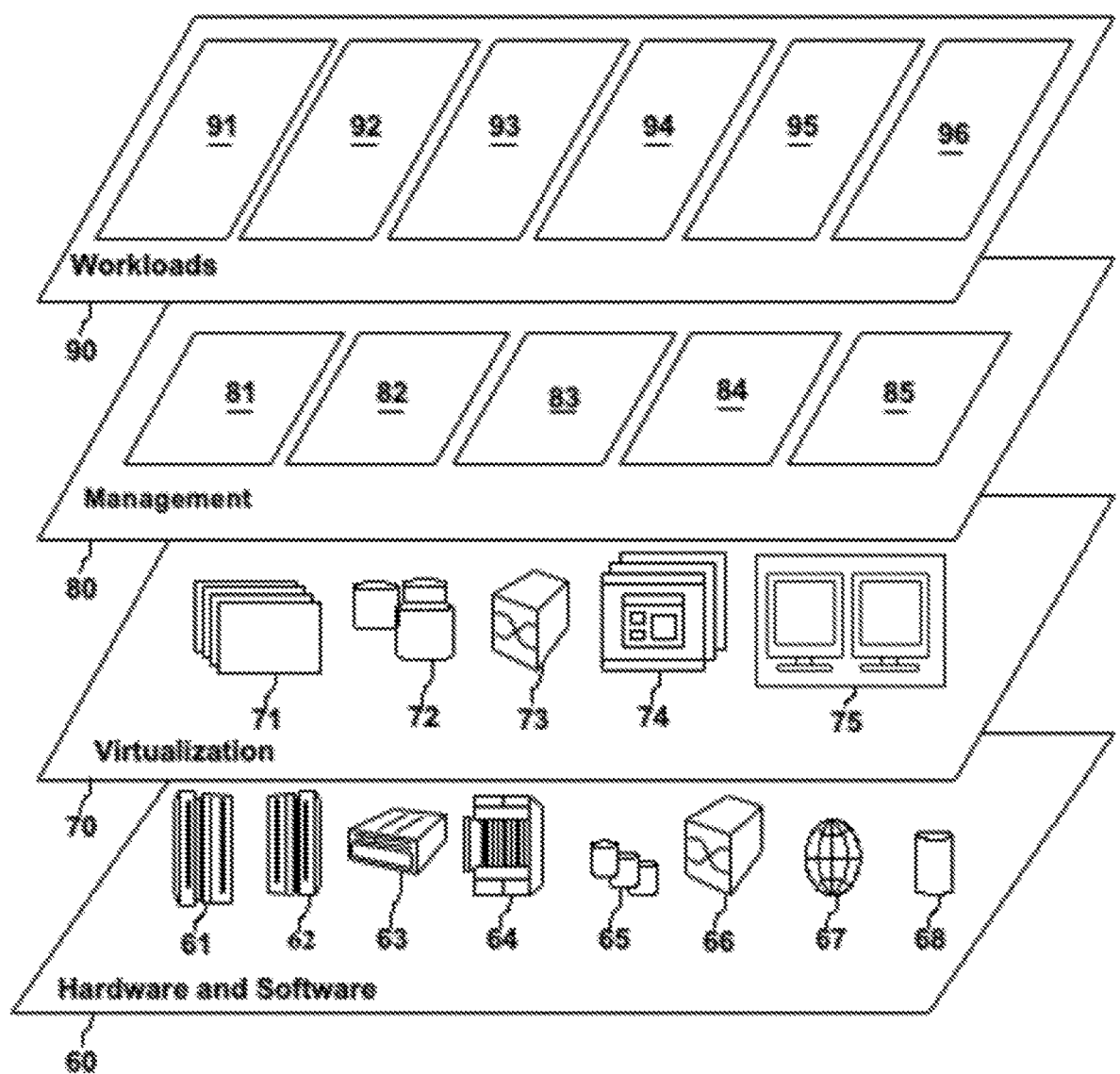
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and webpages management 96.

When a user browses a webpage to look for some information, the user would go deep into many other related webpages through tags on the webpage. As more and more webpages are opened on one web browser, a large amount of CPU and memory resource are consumed. The user desires to clear up those unwanted webpages. A functionality provided is to close all webpages in a browser at a time. However, these functionalities are not convenient for a user if the user still wants to keep some of them. The user has to spend time closing the unwanted webpages one by one. A solution is provided to close a plurality of webpages which are related in the content. It costs a large amount of computing resource to analyze the relationship of the contents of the plurality of webpages. So it is desirable to close those unwanted webpages in a more efficient way.

According to embodiments of the present disclosure, a solution is proposed to allow a user to close a plurality of webpages having a multi-level parent-child relationship in a browser. The multi-level parent-child relationship of the plurality of webpages can be recorded in one or more records. These records can be analyzed to determine if a webpage to be closed has a URL chain consisting of a plurality of URLs having a multi-level parent-child relationship. The user can be provided a selection to close the plurality of webpages related to the URL chain. With this solution, the user need not individually visit each webpage and take decision of closing it. The webpages in a web browser are cleared up in a more efficient and more convenient way. A large amount of CPU and memory resource can be saved.

Figure 4:
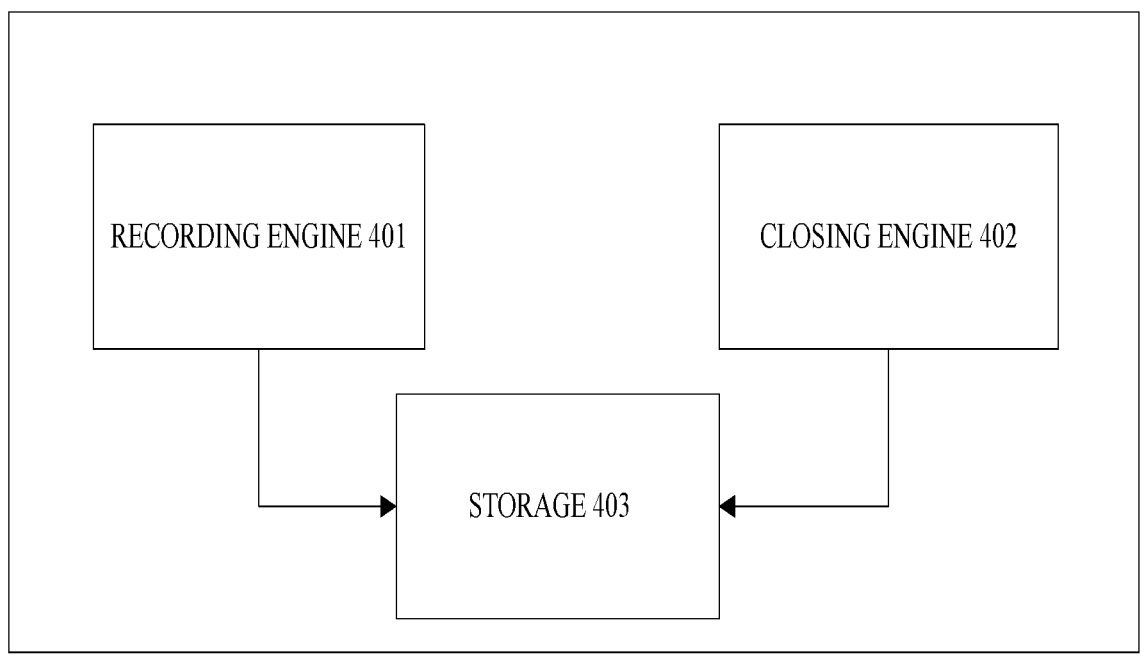
FIG. 4 depicts a system according to an embodiment of the present invention.

With reference now to FIG. 4, system 400 according to an embodiment of the present disclosure is depicted. System 400 may include recording engine 401, closing engine 402 and storage 403. Recording engine 401 and/or closing engine 402 can be integrated into a browser. Recording engine 401 and/or closing engine 402 can also be implemented as a plugin in a browser. The recording engine 401 comprises computer executed instructions to record one or more records, each record comprising at least two URLs with a parent-child relationship. Recording engine 401 can store a plurality of records in storage 403. Closing engine 402 comprises computer executed instructions to acquire one or more records from computer readable storage 403. Then closing engine 402 can determine if a webpage to be closed has a URL chain consisting of a plurality of URLs with a multi-level parent-child relationship. The embodiments of present disclosure will be described by referring to system 400 in FIG. 4.

According to an embodiment of present disclosure, a plurality of records are created to record a multi-level parent-child relationship of a plurality of webpages. FIG. 5 describes an example method 500 for recording a parent-child relationship between two webpages according to an embodiment of the present disclosure. The method 500 can be implemented by recording engine 401. The method 500 comprises S502-S506. At S502, in response to acquiring a request to access a new webpage, a URL of the new webpage is acquired from the request. At S504, it is determined that the new webpage and a current active webpage have a parent-child relationship in response to retrieving the URL of the new webpage from a URL list of the current active webpage. At S506, the parent-child relationship between the new webpage and the current active webpage is recorded as a record.

Figure 6:
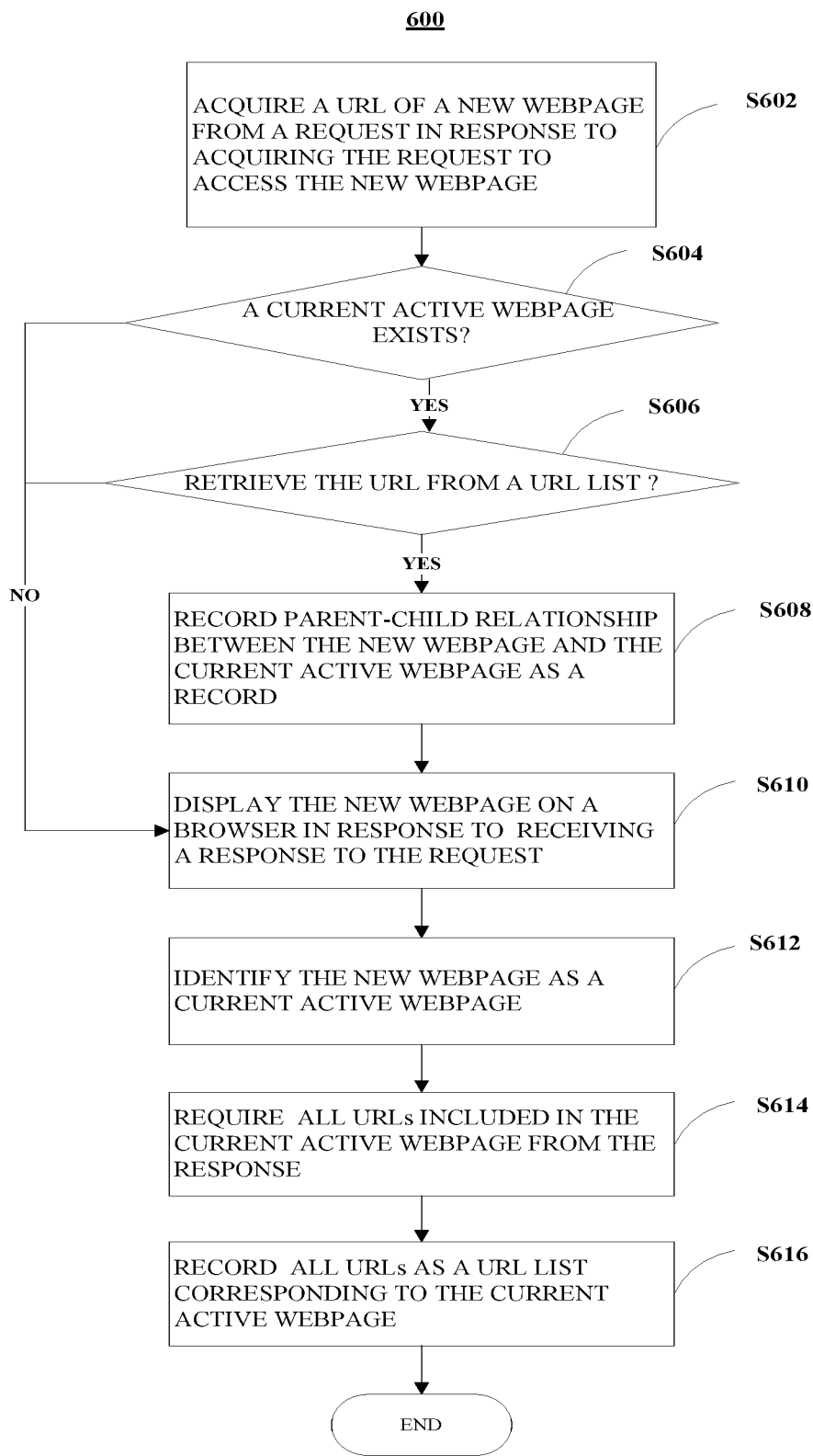
FIG. 6 depicts a flowchart of an example method for recording parent-child relationship between two webpages according to an embodiment of the present disclosure.

FIG. 6 depicts a flowchart 600 of an example method 500 for recording a parent-child relationship between two webpages according to an embodiment of the present disclosure. The flowchart 600 comprises S602-S616.

At S602, a URL of the new webpage can be acquired from a request in response to acquiring a request to access a new webpage. At S604, it is determined whether a current active webpage exists. The current active webpage herein refers to a webpage being displayed currently. The current active webpage can be identified in browser. If the current active webpage exists, then the method goes to S606. If the current active webpage does not exist, then the method goes to S610. At S606, it is determined whether the URL of the new webpage can be retrieved from a URL list corresponding to the current active webpage. If the URL of the new webpage can be retrieved, then at S608, a parent-child relationship between the URL of the new webpage and a URL of the current active webpage can be recorded as a record. Then the method goes to S610. If the URL of the new webpage cannot be retrieved, then the method goes to S610. At S610, in response to receiving a response to the request from a web server, the new webpage is displayed on a browser. At S612, the new webpage is identified to be a current active webpage. At S614, all URLs included in the current active webpage can be acquired from the response. At S616, all URLs acquired can be recorded as a URL list corresponding to the current active webpage. It shall be understood that many methods can be applied to get a URL list from a webpage. For example, a Web crawler (also known as a Web spider or a Web robot) is a program or an automated script which can get a specified webpage from the Internet and extract all the links included in the webpages, then add the extracted links to the URL list corresponding to the webpage. Then the flowchart 600 goes to the end.

Figure 7:
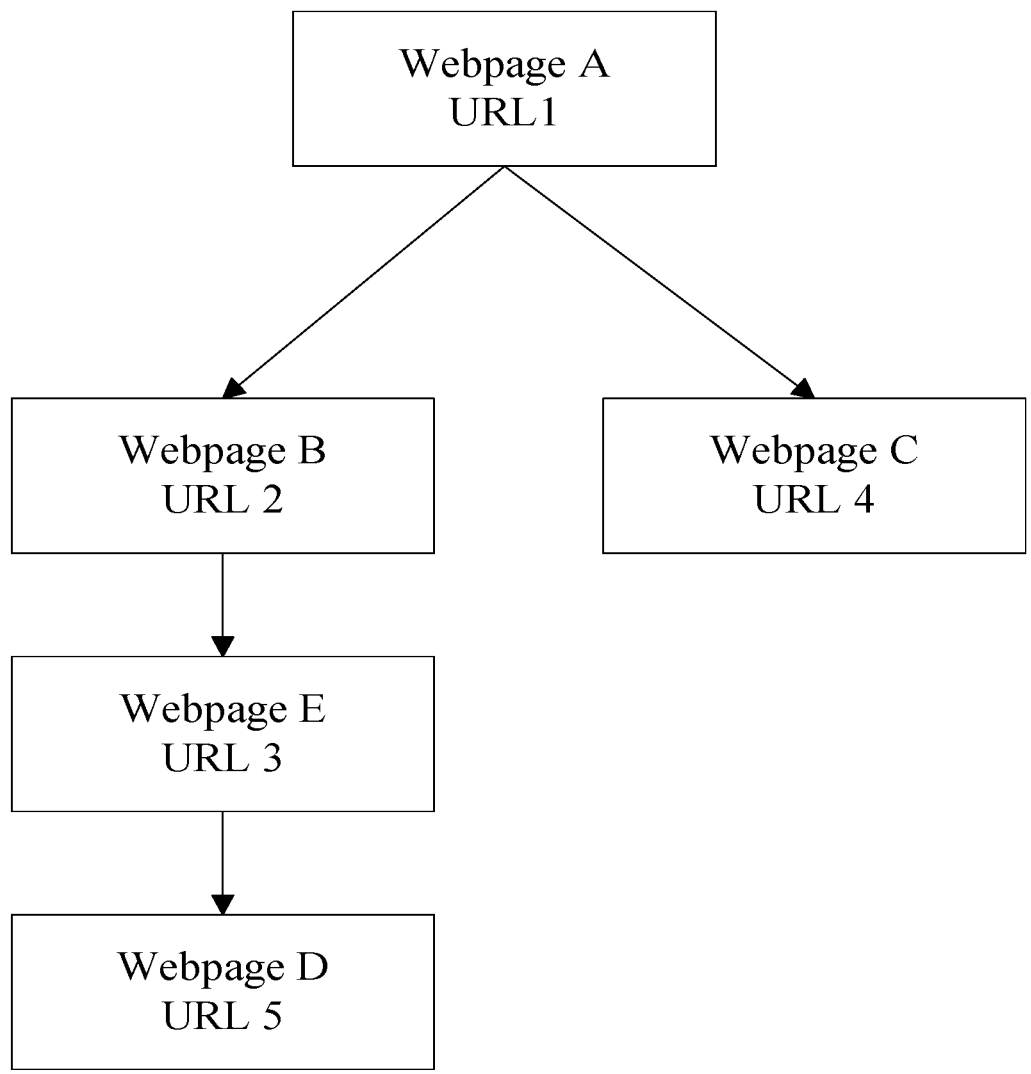
FIG. 7 depicts a plurality of example webpages with multi-level parent-child relationships according to an embodiment of the present disclosure.

FIG. 7 depicts a plurality of example webpages with a multi-level parent-child relationship according to an embodiment of the present disclosure. As shown in FIG. 7, webpage A is a first webpage a user has accessed. Webpages B and C are accessed from two tags on webpage A respectively. Webpage E is accessed from a tag on webpage B.

Webpage D has been assessed from a tag on webpage E. Webpage A and webpage B have a first level parent-child relationship in which Webpage A is a parent webpage and webpage B is a child webpage. Webpage A and webpage C have a first level parent-child relationship in which Webpage A is a parent webpage and webpage C is a child webpage. Webpage B and webpage E have a first level parent-child relationship in which Webpage B is a parent webpage and webpage E is a child webpage. Webpage E and webpage D have a first level parent-child relationship in which Webpage E is a parent webpage and webpage D is a child webpage. Webpage A and webpage E have a second level parent-child relationship in which Webpage A is a parent webpage and webpage E is a child webpage. Webpage B and webpage D have a second level parent-child relationship in which Webpage B is a parent webpage and webpage D is a child webpage. Webpage A and webpage D have a third level parent-child relationship in which Webpage A is a parent webpage and webpage D is a child webpage. Webpages A, B, E, and D have a multi-level parent-child relationship. Webpage B and Webpage C don't have a parent-child relationship but have a relative relationship. Webpage E and Webpage C have a relative relationship. Webpage D and Webpage C have a relative relationship. According to the present disclosure, if a plurality of webpages have a multi-level parent-child relationship, a plurality of URLs of the plurality of webpages can be defined to have the multi-level parent-child relationship. For example, URL 1 and URL 2 have a first level parent-child relationship in which URL 1 is a parent URL and URL 2 is a child URL. If two webpages have a relative relationship, two URLs of the two webpages can be defined to have the relative relationship. For example, URL 2 and URL 4 have a relative relationship. According to embodiments of present disclosure, a multi-level parent-child relationship includes a first level parent-child relationship, a second level parent-child relationship, a third level parent-child relationship and so on.

According to the method 500, one and more records can be created to record a multi-level parent-child relationship of a plurality of URLs. With reference to FIG. 7, a process of creating a plurality of records comprising a plurality of URLs with a multi-level parent-child relationship will be described.

At first, after a user opens a browser and inputs a URL 1 on a browser, the browser receives a request to access webpage A. The recording engine 401 acquires URL 1 from the request. As webpage A is a first webpage requested on the browser, a current active webpage does not exist. After a response to the request is received and webpage A is displayed on the browser, webpage A is identified to be a current active webpage. Then all URLs included in webpage A are acquired from the response. All URLs included in webpage A are recorded as a URL list corresponding to webpage A. For example, Table 1 shows an example URL list corresponding to webpage A.

TABLE 1

| URL 1 | http//:www.def.com/homepage/music/23679 |
| URL 2 | http//:www.street.com/homepage/sports/abcd |
| URL 4 | http:// en.wikipedia.org/wiki/history |
| URL b | http//:www.directory.com/home/travel guide/54337 |
| ... | |

Secondly, the user clicks a tag on webpage A and would access webpage B. According to the above method 500, the browser receives a request to access webpage B. The recording engine 401 acquires URL 2 from the request. As a current active webpage A exists, the recording engine 401 searches the URL list corresponding to webpage A for URL 2. After URL 2 is retrieved in the URL list, it indicates that webpage A and webpage B have a parent-child relationship. In this case, webpage A is called a parent webpage and webpage B is called a child webpage. URL 1 and URL 2 are saved as a record in Table 2.

TABLE 2

|  | URL of Parent webpage | URL of Child webpage |
|---|---|---|
| Record 1 | URL 1 | URL 2 |

After the response to the request is received and webpage B is displayed on the browser, webpage B is identified to be a current active webpage. Then all URLs included in webpage B are acquired from the response. All URLs included in webpage B are recorded as a URL list corresponding to webpage B. For example, Table 3 shows an example URL list corresponding to webpage B.

TABLE 3

| URL 2 | http//:www.street.com/homepage/sports/abcd |
| URL 3 | http://www.weather.com/home/electronics/3478 |
| URL c | http://en.wikipedia.org/wiki/education |
| ... | ... |

Thirdly, the user clicks a tag on webpage B and would access webpage E. Similarly, the browser receives a request to access webpage E. The recording engine 401 acquires URL 3 from the request. As a current active webpage B exists, the recording engine 401 searches the URL list corresponding to webpage B in Table 3 for URL 3. After URL 3 is retrieved in Table 3, it indicates that webpage B and webpage E have a parent-child relationship. In this case, webpage B is called a parent webpage and webpage B is called a child webpage. URL 2 and URL 3 are added to Table 2 as a record.

TABLE 2

|  | URL of Parent webpage | URL of Child webpage |
|---|---|---|
| Record 1 | URL 1 | URL 2 |
| Record 2 | URL 2 | URL 3 |

The parent-child relationship between webpage B and webpage E is added to Table 2 as a record. After the response to the request is received and webpage E is displayed on the browser, webpage E is identified to be a current active webpage. Then all URLs included in webpage E are acquired from the response. All URLs included in webpage E are recorded as a URL list corresponding to webpage E in Table 4.

TABLE 4

| URL 3 | http://www.weather.com/home/electronics/3478 |
| URL 5 | http://www.world.com/home/education/1222 |
| URL e | http://www.univercity.org/homepage/location |
| ... | ... |

Furthermore, the user clicks a tag on webpage E and would access webpage D of the tag. Similarly, the browser receives a request to access webpage D. The recording engine 401 acquires URL 5 from the request. As a current active webpage E exists, the recording engine 401 searches the URL list corresponding to webpage E in Table 4 for URL 5. After URL 5 is retrieved in Table 4, it indicates that webpage E and webpage D have a parent-child relationship. URL 3 and URL 5 are added to Table 2 as a record. After the response to the request is received and webpage D is displayed on the browser, webpage D is identified to be a current active webpage. Then all URLs included in webpage D are acquired from the response. All URLs included in webpage D are recorded as a URL list corresponding to webpage D (Not shown).

TABLE 2

|  | URL of Parent webpage | URL of Child webpage |
|---|---|---|
| Record 1 | URL 1 | URL 2 |
| Record 2 | URL 2 | URL 3 |
| Record 3 | URL 3 | URL 5 |

Finally, the user clicks a tag of webpage A, and webpage A is displayed on the browser. Webpage A is identified to be a current active webpage by the recording engine 401. The user further clicks a tag on webpage A and would access webpage C. The browser receives a request to access webpage C. The recording engine 401 acquires URL 4 from the request. As a current active webpage A exists, the recording engine 401 searches the URL list corresponding to webpage A in Table 1 for URL 4. After URL 4 is retrieved in Table 1, it indicates that webpage A and webpage C have a parent-child relationship. URL 1 and URL 4 are added to Table 2 as a record.

TABLE 2

|  | URL of Parent webpage | URL of Child webpage |
|---|---|---|
| Record 1 | URL 1 | URL 2 |
| Record 2 | URL 2 | URL 3 |
| Record 3 | URL 3 | URL 5 |
| Record 4 | URL 1 | URL 4 |

After the response to the request is received and webpage C is displayed on the browser, webpage C is identified to be a current active webpage. Then all URLs included in webpage C are acquired from the response. All URLs included in webpage C are recorded as a URL list corresponding to webpage C (Not shown).

According to an embodiment, a plurality of records about the plurality of URLs with a multi-level parent-child relationship can be organized in a data structure with key-value such as a child HashMap. The child HashMap includes one or more records. Each record includes a URL of a parent webpage and at least one child URL of the URL of a parent webpage. In one embodiment, in each record, a URL of each parent webpage can be saved as a key in the child HashMap, at least one URL of at least one first level child webpage of a parent webpage can be saved as at least one value corresponding to the key in the child HashMap. A plurality of keys in the child HashMap constitute a key set. A plurality of values corresponding to a key constitute a value set. As shown in Table 5, URLs 1, 2, and 3 of Parent webpages A, B and E are respective keys in the child HashMap. The key set includes URLs 1, 2, and 3. URLs 2 and 4 of child webpages B and C are values of URL 1. URL 3 of child webpage E is a value of URL 2. URL 5 of child webpage D is a value of URL 3.

TABLE 5

|  | URL of Parent webpage | URL of Child webpage |
|---|---|---|
| Record 1 | URL 1 | URL 2, URL 4 |
| Record 2 | URL 2 | URL 3 |
| Record 3 | URL 3 | URL 5 |

According to an embodiment, one or more records comprising a plurality of URLs with a multi-level parent-child relationship can be organized in a data structure with key-value such as a parent HashMap. For each child webpage of the plurality of child webpages, a URL of each child webpage can be saved as a key in the parent HashMap, and at least one URL of at least one first level parent webpage of each child webpage can be saved as at least one value corresponding to the key in the child HashMap. As shown in Table 6, URLs 2, 3, 4, and 5 of child webpages B, E, C and D are respective keys in the parent HashMap. URL 1 of parent webpage A is a value of URL 2. URL 1 of parent webpage A is a value of URL 4. URL 3 of parent webpages E is a value of URL 5. URL 2 of parent webpage B is a value of URL 3. Child webpage B and Parent webpage A are constructed to be a first level parent-child relationship. Child webpage C and Parent webpage A are constructed to be a first level parent-child relationship. Child webpage D and Parent webpage E are constructed to be a first level parent-child relationship. Child webpage E and Parent webpage B are constructed to be a first level parent-child relationship. Child webpage D and Parent webpage B are constructed to be a second level parent-child relationship. Child webpage E and Parent webpage A are constructed to be a second level parent-child relationship. Child webpage D and Parent webpage A are constructed to be a third level parent-child relationship.

TABLE 6

|  | URL of Child webpage | URL of Parent webpage |
| --- | --- | --- |
| Record 1 | URL 2 | URL 1 |
| Record 2 | URL 4 | URL 1 |
| Record 3 | URL 5 | URL 3 |
| Record 4 | URL 3 | URL 2 |

The records in Tables 2, 5, and 6 are for purposes of illustration but are not intended to be exhaustive or limited to the embodiments disclosed. Those in the art should understand that the records can also be saved in a form of a file such as XML, file or other data structures.

Figure 8:
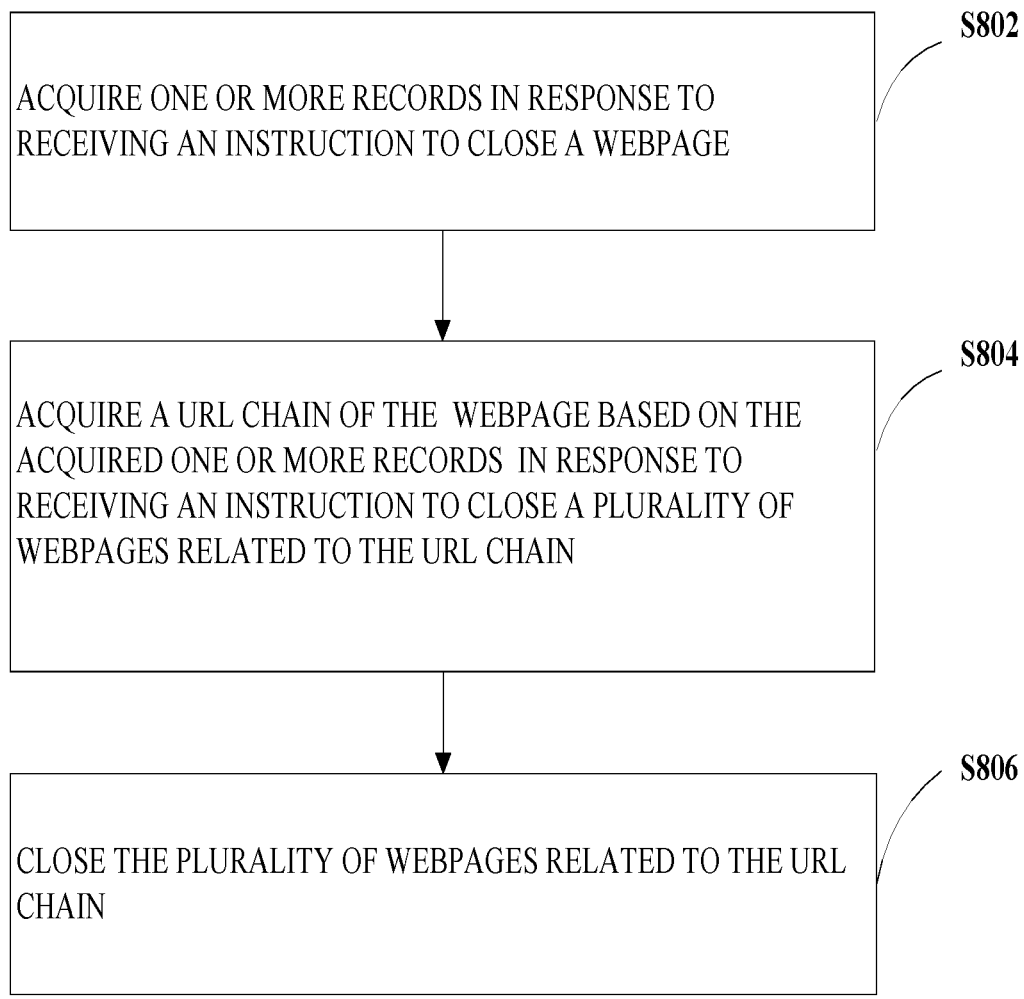
FIG. 8 depicts an example method for closing a plurality of webpages in a browser according to an embodiment of the present invention.

FIG. 8 depicts an example method 800 for closing a plurality of webpages in a browser according to an embodiment of the present invention. The method 800 can be implemented in closing engine 402. The method 800 comprises S802-S806.

At S802, in response to receiving an instruction to close a webpage, one or more records are acquired. Each record comprises at least two URLs with a parent-child relationship. At S804, a URL chain of the webpage is acquired based on the acquired one or more records in response to receiving an instruction to close a plurality of webpages related to the URL chain. The URL chain consists of a plurality of URLs with a multi-level parent-child relationship. At S806, the plurality of webpages related to the URL chain are closed.

Figure 9:
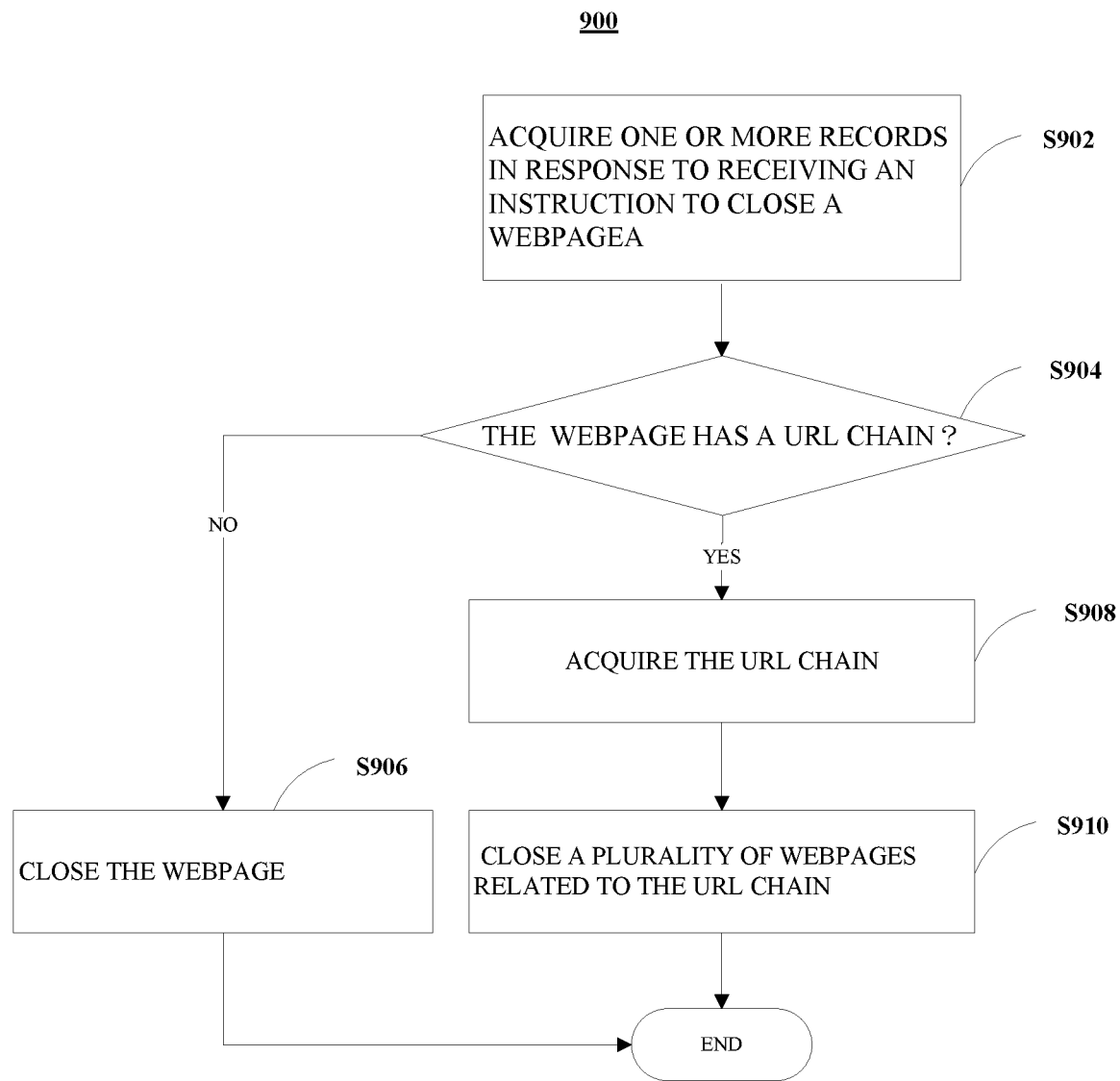
FIG. 9 depicts a flowchart of example method for closing a plurality of webpages in a browser according to an embodiment of the present invention.

FIG. 9 depicts a flowchart 900 of example method 800 for closing a plurality of webpages in a browser according to an embodiment of the present invention.

At S902, in response to receiving an instruction to close a webpage, one or more records are acquired. As described in above method 500 and flowchart 600, when a request to access a new webpage is acquired, it is determined if the new webpage and a current active webpage have a parent-child relationship. If the determination result is Yes, then the parent-child relationship between the new webpage and the current active webpage is recorded as a record. According to an embodiment, closing engine 402 can access storage 403 to acquire one or more records in a child HashMap or in a parent HashMap. Each record in a child HashMap or in a parent HashMap comprises at least two URLs with a parent-child relationship.

At S904, it is determined whether the webpage has a URL chain based on the acquired one or more records. The URL of the webpage can be searched in one or more records. In an embodiment, a functionality to close at least one multi-level child URL of a webpage is provided. the URL of the webpage can be searched in a key set of a child HashMap. If the URL of the webpage cannot be found, it indicates that the URL of the webpage is not a parent URL. Then the process goes to S906, the webpage is closed. The Process goes to the end. If the URL of the webpage can be retrieved, it indicates that the URL of the webpage is a parent URL and has a URL chain. In another embodiment, a functionality to close at least one multi-level child URL of a webpage and at least one multi-level parent URL of a webpage is provided. The URL of the webpage can be searched in both a key set of a child HashMap and a key set of a parent HashMap. If the URL of the webpage cannot be found, it indicates that the URL of the webpage is neither a parent URL or a child URL and has not a URL chain. Then the process goes to S906, the webpage is closed. The Process goes to the end. If the URL of the webpage can be retrieved, it indicates that the URL of the webpage is either a parent URL or a child URL and has a URL chain.

Figure 10:
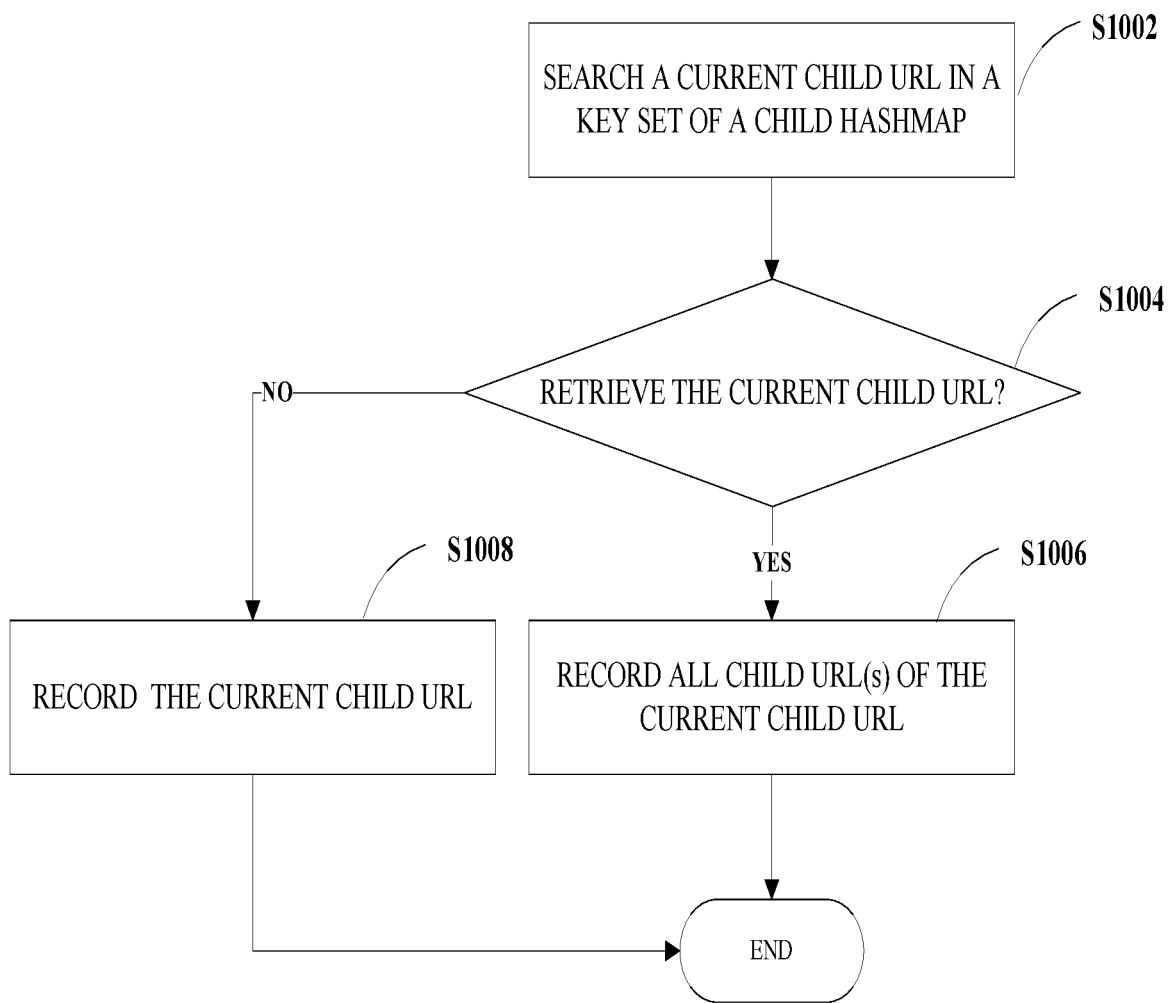
FIG. 10 depicts an example flowchart for acquiring at least one multi-level child URL according to an embodiment of the present invention.

According to an embodiment, if the URL of the webpage has at least one first level child URL, for each first level child URL of at least one first level child URL, it is necessary to traverse the one or more records to determine if each first level child URL has at least one child URL. If a first level child URL has at least one child URL, it indicates that URL of the webpage has at least one second level child URL. Then for each second level child URL, above traverse process is repeated. The traverse process can be stopped until one multi-level child URL does not have any further child URL. By this method, at least one multi-level child URL of the URL of the webpage can be determined and recorded. The URL chain of the webpage comprises the URL of the webpage and the at least one multi-level child URL. FIG. 10 depicts an example flowchart 1000 for acquiring at least one multi-level child URL according to an embodiment of the present invention. The flowchart method 1000 is implemented for searching at least one multi-level child URL of each child URL of at least one multi-level child URL. At S1002, a current child URL is searched in a key set of a child HashMap. At S1004, if the current child URL cannot be retrieved, then at S1008, the current child URL is recorded. If the current child URL can be retrieved, then at S1006, all child URLs of the current child URL are recorded. After the flowchart method 1000 is repeatedly implemented for each child URL of at least one multi-level child URL, at least one multi-level child URL of the URL of the webpage can be acquired.

Figure 11:
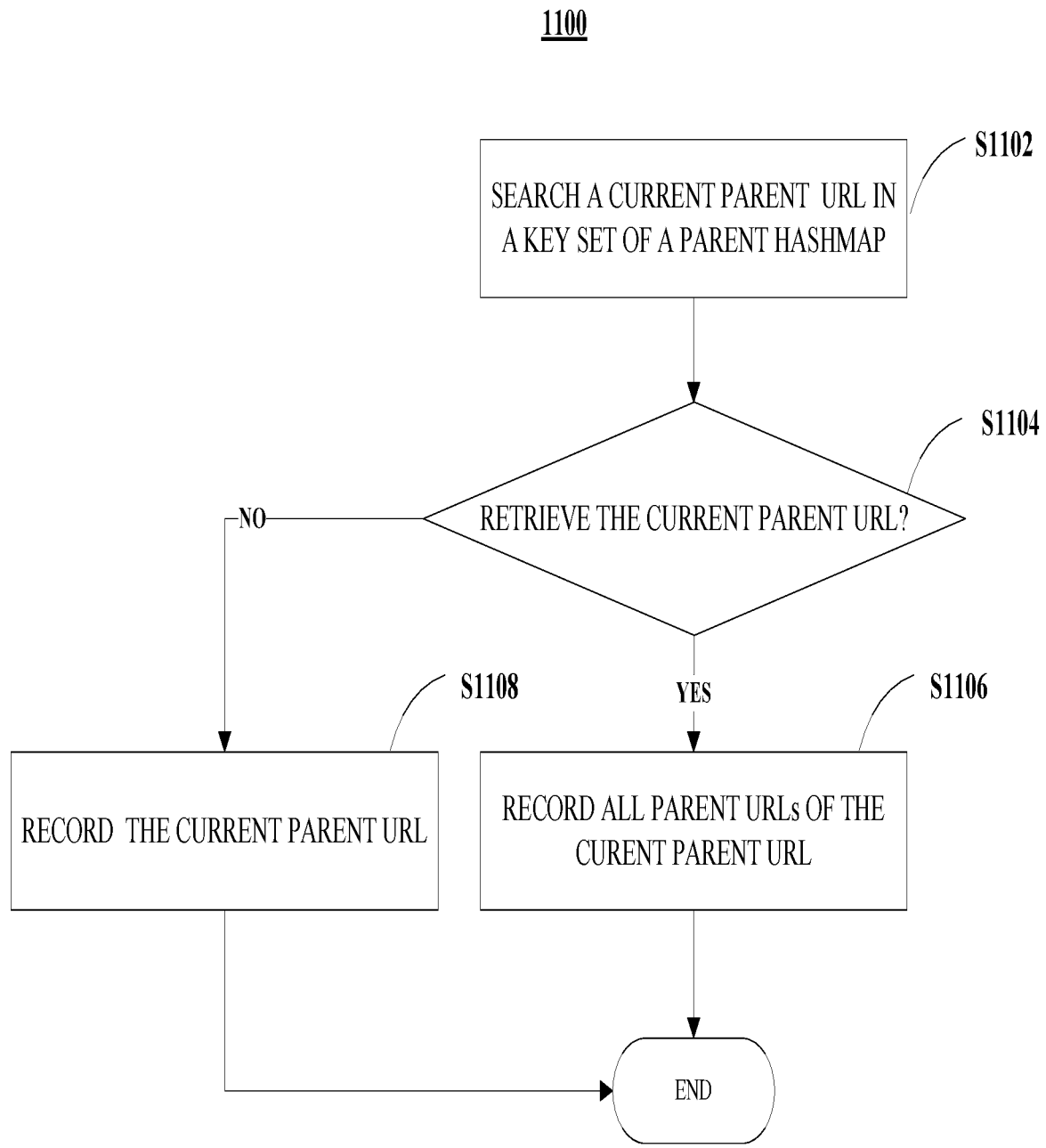
FIG. 11 describes an example flowchart for acquiring at least one multi-level parent URL according to an embodiment of the present invention.

In an embodiment, if the URL of a webpage to be closed has at least one multi-level parent URL, for each first level parent URL of at least one first level parent URL, it is necessary to traverse the one or more records to determine if each first level parent URL has at least one parent URL. If a first level parent URL has at least one parent URL, it indicates that URL of the webpage has at least one second level parent URL. Then for each second level parent URL, above traverse process is repeated. The traverse process can be stopped until one multi-level parent URL does not have any further parent URL. By this method, at least one multi-level parent URL of the URL of the webpage can be determined and recorded. The URL chain of the webpage comprises the URL of the webpage and the at least one multi-level parent URL. FIG. 11 describes an example flowchart 1100 for acquiring at least one multi-level parent URL according to an embodiment of the present invention. The flowchart method 1100 is implemented for each parent URL of at least one multi-level parent URL. At S1102, a current parent URL is searched in a key set of a parent HashMap. At S1104, if the current parent URL cannot be retrieved, then At S1108, the current parent URL is recorded. If the current parent URL can be retrieved, then At S1106, all parent URLs of the current parent URL are recorded. After the flowchart method 1100 is repeatedly implemented for each child URL of at least one multi-level parent URL, at least one multi-level parent URL of the URL of the webpage can be acquired.

According to an embodiment, if the URL of a webpage to be closed has at least one multi-level child URL and/or at least one multi-level parent URL. Then it can be determined that the webpage has a URL chain comprising the URL of the webpage, the at least one multi-level child URL and the at least one multi-level parent URL. The at least one multi-level child URL and the at least one multi-level parent URL can be determined respectively by referring to the above flowchart methods 1000 and 1100.

According to an embodiment, if the URL of a webpage to be closed has at least one multi-level child URL and/or at least one multi-level parent URL and/or at least one relative URL. Then it can be determined that the current active webpage has a URL chain comprising the URL of the current active webpage and the at least one multi-level child URL and/or the at least one multi-level parent URL and/or the at least one relative URL. The at least one multi-level child URL and the at least one multi-level parent URL can be determined respectively by referring to the above flowchart methods 900 and 1000. For each parent URL of the at least one multi-level parent URL, it is necessary to traverse the child HashMap to determine if at least one other child URL than the retrieved at least one multi-level child URL exists. If the at least one other child URL exists, it indicates that the URL of the webpage has at least one relative URL. Then at least one relative URL can be determined and required if the at least one relative URL has at least one multi-level child URL by referring to the above flowchart methods 1000.

At S908, in response to receiving an instruction to close a plurality of webpages related to the URL chain, the URL chain of the webpage to be closed is acquired. A user can be provided a selection of closing a plurality of webpages related to the URL chain. For example, a prompt box is shown in a user interface of a browser. In one embodiment, the prompt box is "Would you close all child webpages?". In another embodiment, the prompt box is "Would you close all parent webpages?". In yet another embodiment, the prompt box is "Would you close all child webpages and parent webpages?" or "Would you close all child webpages and parent webpages and relative webpages?". In response to user's selection, a URL chain of the webpage can be acquired, then a plurality of webpages corresponding to a set of URLs included in the URL chain would be closed.

At S910, the plurality of webpages related to the URL chain are closed. In the case that the user selects to close a webpage and its multi-level child webpages and the URL chain of the webpage comprises the URL of the webpage and the at least one multi-level child URL, the webpage and at least one multi-level child webpage may be closed. All URLs included in the URL chain are deleted from the value sets of the records in a child HashMap. If the URLs in the key sets of the records don't have any child URL anymore, the URLs are deleted from the key sets of the records in the child HashMap. In the case that the user selects to close a webpage and its multi-level parent webpages and the URL chain of the webpage comprises the URL of the webpage and the at least one multi-level parent URL, the webpage and at least one multi-level parent webpage may be closed. All URLs included in the URL chain are deleted from the value sets of the records in a parent HashMap. If the URLs in the key sets of the records don't have any parent URL anymore, the URLs are deleted from the key sets of the records in the parent HashMap. In the case that the user selects to close a webpage and its multi-level parent and its multi-level child URL and the URL chain of the webpage comprises the URL of the webpage and at least one multi-level child URL and at least one multi-level parent URL, the webpage and at least one multi-level child webpage and at least one multi-level parent webpage may be closed. All URLs included in the URL chain are deleted from the value sets of the records in a child HashMap and in a parent HashMap. If the URLs in the key sets of the records in the child HashMap don't have any child URL anymore, the URLs are deleted from the key sets of the records in the child HashMap. If the URLs in the key sets of the records in the parent HashMap don't have any parent URL anymore, the URLs are deleted from the key sets of the records in the parent HashMap. In the case that the user selects to close a webpage and/or its multi-level parent and/or child and/or relative URL and the URL chain of the webpage comprises the URL of the webpage and/or at least one multi-level child URL and/or at least one multi-level parent URL and/or at least one relative URL. The webpage, at least one multi-level child webpage, at least one multi-level parent webpage and at least one relative webpage may be closed. After that, all URLs included in the URL chain are deleted from the value sets of the records in a child HashMap and/or in a parent HashMap. If the URLs in the key sets of the records in the child HashMap don't have any child URL anymore, the URLs are deleted from the key sets of the records in the child HashMap. If the URLs in the key sets of the records in the parent HashMap don't have any parent URL anymore, the URLs are deleted from the key sets of the records in the parent HashMap.

According to an embodiment, it is assumed that webpage B in FIG. 7 is a webpage to be closed. At least one multi-level child URL of webpage B can be determined in this embodiment combining with Table 5. URL 2 of webpage B can be found in a key set of Table 5, which indicates that URL 2 is a parent URL. URL 3 can be acquired from a value set corresponding to URL 2, which indicates that URL 3 is a child URL of URL 2. Then URL 3 is searched in the key set of Table 5. After URL 3 is found in the key set of Table 5, URL 5 can be acquired from a value set corresponding to URL 3. It indicates that URL 5 is a child URL of URL 3. Then URL 5 is searched in the key set of Table 5. As URL 5 cannot be found in the key set of Table 5, it indicates that URL 5 is not a parent URL. For the parent URL 2, URL 3 is a first level child URL and URL 5 is a second level child URL. The URL chain of webpage B comprises URL 2, URL 3 and URL 5. After receiving an instruction to close a plurality of webpages related to the URL chain of webpage B, webpages E and D would be closed together with webpage B. Then URL 2, URL 3 and URL 5 are deleted from the records 1, 2 and 3 in Table 5. The records 2 and 3 are deleted from Table 5.

According to an embodiment, it is assumed that webpage E in FIG. 7 is a webpage to be closed. At least one multi-level parent URL of webpage E can be determined in this embodiment combining with Table 6. URL 3 is searched in the key set of Table 6. URL 3 can be retrieved in a key set of Table 6 which indicates that URL 3 is a child URL. URL 2 can be acquired from a value set corresponding to URL 3. It indicates that URL 2 is a parent URL of URL 3. Then URL 2 is searched in the key set of Table 6. URL 2 can be found in the key set of Table 6, which indicates that URL 2 is a child URL. URL 1 can be acquired from a value set corresponding to URL 2. It indicates that URL 1 is a parent URL of URL 2. Then URL 1 is searched in the key set of Table 6. As URL 1 cannot be found in the key set of Table 6, it indicates that URL 1 is not a child URL. For the child URL 3, URL 2 is a first level parent and URL 1 is a second level parent. The URL chain of webpage E comprises URL 3, URL 2 and URL 1. After receiving an instruction to close a plurality of webpages related to the URL chain of webpage E, webpages B and A would be closed together with webpage E. URLs 3, 2 and 1 are deleted from the value sets of the records 1, 2, 3 and 4 in Table 6. As URLs 2, 4, 5 and 3 in the key sets of records 1, 2, 3 and 4 don't have any parent URL, URLs 2, 4, 5 and 3 are deleted from records 1, 2, 3 and 4. In other words, the records 1, 2, 3 and 4 don't exist anymore.

According to an embodiment, it is assumed that a webpage to be closed is webpage E in FIG. 6. At least one multi-level child URL and at least one multi-level parent URL of webpage E can be determined in this embodiment combining with Table 5 and Table 6. The parent URLs of URL 3 can be determined to be URL 2 and URL 1 as above embodiment. The child URL of URL 3 can be determined to be URLS as above embodiment. The URL chain of webpage E comprises URL 3, URL 2, URL 1 and URL 5. After receiving an instruction to close a plurality of webpages related to the URL chain of webpage E, Webpages A, B and D would be closed together with webpage E. The records 2 and 3 are deleted from Table 5 and the records 1, 2, 3 and 4 are deleted from Table 6.

According to an embodiment, it is assumed that a webpage to be closed is webpage E in FIG. 7. At least one multi-level child URL, at least one multi-level parent URL and at least one relative URL of webpage E can be determined in this embodiment combining with Table 5 and Table 6. As described in above embodiment, URL 2 and URL 1 are determined to be the parent URLs of URL 3. URLS can be determined to be the child URL of URL 3. After traversing Table 5, URL 4 can be determined to be another child of parent URL 1. URL 4 is a relative URL of URL 3. The URL chain of webpage E comprises URL 3, URL 2, URL 1, URL 5 and URL 4. After receiving an instruction to close a plurality of webpages related to the URL chain of webpage E, webpage A, B, C, D would be closed together with webpage E. All records in Table 5 and Table 6 are deleted.

The present invention may be a system, a method, and/or a computer program product at any possible technical detail level of integration. The computer program product may include a computer readable storage medium (or media) having computer readable program instructions thereon to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic wave 1 s propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a programmable data processing apparatus to produce a machine, such that the instructions, which execute via the or of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for closing a plurality of webpages in a browser comprising:
   acquiring, in response to receiving a request to close a webpage, a Uniform Resource Locator (URL) chain of URLs to close, wherein the acquiring comprises:
   traversing a record HashMap for a key corresponding to a URL of the webpage to close;
   each record of a plurality of records in the record HashMap comprising at least two URLs having a parent-child relationship;
   in response to locating the key corresponding to the URL of the webpage to close,
   extracting at least one corresponding value indicating a first-level child URL from the record Hash Map;
   iteratively traversing the record HashMap using the extracted first-level child URL as a parent key, wherein a corresponding value indicating a second-level child URL is identified based on the extracted first-level child URL;
   extracting the second-level child URL;
   whereby the acquired URL chain comprises the URL of the webpage to close, the first-level child URL and the second-level child URL;
   closing, by one or more processor units, the plurality of webpages in the acquired URL chain.

2. The method of claim 1, wherein each record of the plurality of records in the record HashMap is created by actions of:
   extracting into a list, URLs of all links present on a current active webpage, wherein the current active webpage is an open webpage;
   acquiring, by one or more processor units, a URL of a second webpage from the list in response to a request to open the second webpage, and opening the second webpage;
   creating a record of a parent-child relationship between the current active webpage and the second webpage; and
   storing the record as a hash, wherein a parent in the parent-child relationship is a key and a child in the parent-child relationship is a value.

3. The method of claim 1, wherein the acquiring the URL chain of the first webpage further comprises:
   determining, by one or more processor units, the first webpage has a URL chain in response to retrieving a URL of the first webpage in the one or more records; and
   acquiring, by one or more processor units, the URL chain.

4. The method of claim 3, wherein the determining the first webpage has a URL chain further comprises:
   determining, by one or more processor units, the URL of the first webpage has at least one multi-level child URL in the one or more records; and
   determining, by one or more processor units, the first webpage has a URL chain comprising the URL of the first webpage and the at least one multi-level child URL.

5. The method of claim 3, wherein the determining the first webpage has a URL chain further comprise:
   determining, by one or more processor units, the URL of the first webpage has at least one multi-level parent URL in the one or more records; and
   determining, by one or more processor units, the first webpage has a URL chain comprising the URL of the first webpage and the at least one multi-level parent URL.

6. The method of claim 3, wherein the determining the first webpage has a URL chain further comprises:
   determining, by one or more processor units, the URL of the first webpage has at least one multi-level child URL and at least one multi-level parent in the one or more records; and
   determining, by one or more processor units, the webpage has a URL chain comprising the URL of the first webpage and the at least one multi-level child URL and the at least one multi-level parent URL.

7. The method of claim 3, wherein the determining whether the first webpage has a URL chain comprises:

determining, by one or more processor units, the URL of the first webpage has at least one multi-level child URL, at least one multi-level parent URL and at least one relative URL in the one or more records; and determining, by one or more processor units, the first webpage has a URL chain comprising the URL of the first webpage and/or the at least one multi-level child URL and/or the at least one multi-level parent URL and/or the at least one relative URL.

8. A computer-implemented system for replaying operations on a widget in a graphical user interface (GUI) comprising:

one or more processors, one or more computer-readable memories, one or more computer readable tangible storage medium, and program instructions stored on at least one of the one or more tangible storage medium for execution by at least one of the one or more processors via at least one of the one or more memories, wherein the computer system is capable of performing a method comprising:

acquiring, in response to receiving a request to close a webpage, a Uniform Resource Locator (URL) chain of URLs to close, wherein the acquiring comprises:

traversing a record HashMap for a key corresponding to a URL of the webpage to close;

each record of a plurality of records in the record HashMap comprising at least two URLs having a parent-child relationship;

in response to locating the key corresponding to the URL of the webpage to close, extracting at least one corresponding value indicating a first-level child URL from the record Hash Map;

iteratively traversing the record HashMap using the extracted first-level child URL as a parent key, wherein a corresponding value indicating a second-level child URL is identified based on the extracted first-level child URL;

extracting the second-level child URL;

whereby the acquired URL chain comprises the URL of the webpage to close, the first-level child URL and the second-level child URL;

closing, by one or more processor units, the plurality of webpages in the acquired URL chain.

9. The system of claim 8, wherein each record of the plurality of records in the record HashMap is created by actions of:

extracting into a list, URLs of all links present on a current active webpage, wherein the current active webpage is an open webpage;

acquiring a URL of a second webpage from the list in response to a request to open the second webpage, and opening the second webpage, the URL of the second webpage being one of the at least two URLs;

creating a record of a parent-child relationship between the current active webpage and the second webpage; and storing the record as a hash, wherein a parent in the parent-child relationship is a key and a child in the parent-child relationship is a value.

10. The system of claim 8, wherein the acquiring the URL chain of the first webpage further comprises:

determining the first webpage has a URL chain in response to retrieving a URL of the first webpage in the one or more records; and acquiring the URL chain.

11. The system of claim 10, wherein the determining the first webpage has a URL chain comprises:

retrieving the URL of the first webpage in the one or more record;

determining the URL of the first webpage has at least one multi-level child URL in the one or more records; and determining the webpage has a URL chain comprising the URL of the first webpage and the at least one multi-level child URL.

12. The system of claim 10, wherein the determining whether the first webpage has a URL chain comprises:

retrieving the URL of the first webpage in the one or more record;

determining the URL of the first webpage has at least one multi-level parent URL in the one or more records; and determining the first webpage has a URL chain comprising the URL of the first webpage and the at least one multi-level parent URL.

13. The system of claim 10, wherein the determining whether the first webpage has a URL chain comprises:

retrieving the URL of the first webpage in the one or more record;

determining the URL of the first webpage has at least one multi-level child URL and at least one multi-level parent in the one or more records; and determining the first webpage has a URL chain comprising the URL of the first webpage and the at least one multi-level child URL and the at least one multi-level parent URL.

14. The system of claim 10, wherein the determining whether the first webpage has a URL chain comprises:

retrieving the URL of the first webpage in the one or more record;

determining the URL of the first webpage has at least one multi-level child URL, at least one multi-level parent URL and at least one relative URL in the one or more records; and determining the first webpage has a URL chain comprising the URL of the first webpage and/or the at least one multi-level child URL and/or the at least one multi-level parent URL and/or the at least one relative URL.

15. A computer program product comprising one or more computer-readable storage media and program instructions stored on at least one of the one or more tangible storage media, the program instructions executable by a processor to cause the processor to perform a method comprising:

acquiring, in response to receiving a request to close a webpage, a Uniform Resource Locator (URL) chain of URLs to close, wherein the acquiring comprises:

traversing a record HashMap for a key corresponding to a URL of the webpage to close;

each record of a plurality of records in the record HashMap comprising at least two URLs having a parent-child relationship;

in response to locating the key corresponding to the URL of the webpage to close, extracting at least one corresponding value indicating a first-level child URL from the record Hash Map;

iteratively traversing the record HashMap using the extracted first-level child URL as a parent key, wherein a corresponding value indicating a second-level child URL is identified based on the extracted first-level child URL;

extracting the second-level child URL;

whereby the acquired URL chain comprises the URL of the webpage to close, the first-level child URL and the second-level child URL;

closing, by one or more processor units, the plurality of webpages in the acquired URL chain.

16. The computer program product of claim 15, wherein each record of the plurality of records in the record HashMap is created by the actions of:

extracting into a list, URLs of all links present on a current active webpage, wherein the current active webpage is an open webpage;

acquiring a URL of a second webpage from the list in response to a request to open the second webpage, and opening the second webpage, the URL of the second webpage being one of the at least two URLs;

creating a record of a parent-child relationship between the current active webpage and the second webpage; and storing the record as a hash, wherein a parent in the parent-child relationship is a key and a child in the parent-child relationship is a value.

17. The computer program product of claim 15, wherein the acquiring the URL chain of the first webpage further comprises:

determining the first webpage has a URL chain in response to retrieving a URL of the first webpage in the one or more records; and acquiring the URL chain.

18. The computer program product of claim 17, wherein the determining whether the first webpage has a URL chain comprises:

retrieving the URL of the first webpage in the one or more record;

determining the URL of the first webpage has at least one multi-level parent URL and at least one relative URL in the one or more records; and determining the first webpage has a URL chain comprising the URL of the first webpage and the at least one multi-level parent URL.

19. The computer program product of claim 17, wherein the determining whether the first webpage has a URL chain comprises:

retrieving the URL of the first webpage in the one or more record;

determining the URL of the first webpage has at least one multi-level parent URL in the one or more records; and determining the first webpage has a URL chain comprising the URL of the first webpage and the at least one multi-level parent URL.

20. The computer program product of claim 17, the determining whether the first webpage has a URL chain comprises:

retrieving the URL of the first webpage in the one or more record;

determining the URL of the first webpage has at least one multi-level child URL and at least one multi-level parent in the one or more records; and determining the first webpage has a URL chain comprising the URL of the first webpage and the at least one multi-level child URL and the at least one multi-level parent URL.

\* \* \* \* \*